(No Model.)

W. W. DUNN.
CHECK ROW WIRE.

No. 375,275.   Patented Dec. 20, 1887.

WITNESSES
Edwin L. Yewell
F. F. F. Johnson

INVENTOR
W. W. Dunn
J. W. Alexander
Attorney

UNITED STATES PATENT OFFICE.

WILLIAM W. DUNN, OF PEORIA, ILLINOIS.

CHECK-ROW WIRE.

SPECIFICATION forming part of Letters Patent No. 375,275, dated December 20, 1887.

Application filed September 29, 1887. Serial No. 251,079. (No model.)

*To all whom it may concern:*

Be it known that I, WILLIAM W. DUNN, of Peoria, in the county of Peoria and State of Illinois, have invented certain new and useful Improvements in Check-Row Wires; and I do hereby declare that the following is a full, clear, and exact description thereof, reference being had to the accompanying drawings, and to the letters of reference marked thereon, which form part of this specification, in which—

Figure 1:
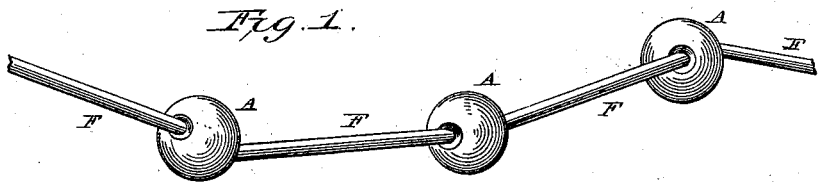
Figure 2:
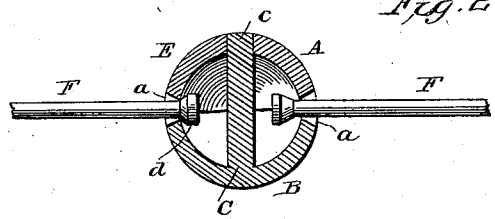
Figure 3:
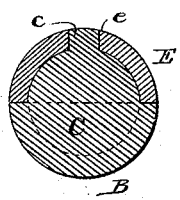
Figure 4:
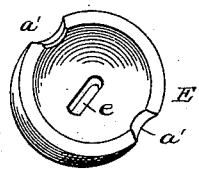
Figure 5:
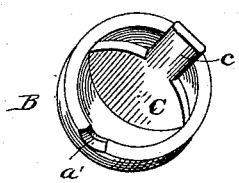
Figure 6:
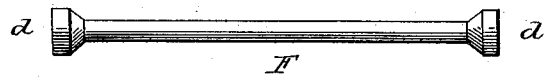

Figure 1 is a view of a section of my improved check-rower wire complete for use. Fig. 2 is a sectional view through one of the ball-knots of the wire, showing the manner of riveting the parts of the same together, the attachment of the wire links, and the central partition. Fig. 3 is a detail sectional view of the ball. Fig. 4 is a perspective view of one half of a ball. Fig. 5 is a similar view of the other half of the same. Fig. 6 is a view of one of the connecting-links.

This invention relates to improvements in check-rower wires which are employed in connection with check-rower planters, which wires are provided at regular intervals of their length with knots or projections adapted to catch upon and operate the planting mechanism of the planter in the usual well-known manner.

My invention has for its objects to provide a flexible swivel-jointed link-wire the knots of which are of perfect spherical form. Further objects of the invention are to improve the construction of the said knots, or "balls," as I shall designate them, so that the ends of the links connected thereto cannot touch each other, and to form such links in such manner that while being securely but loosely attached to said balls they will not have any bends or twists. These objects I attain by the present invention, which consists in the novel construction and arrangement of parts, hereinafter described, illustrated in the drawings, and particularly specified in the claims hereto appended.

Referring to the drawings by letter, A designates the balls or knots, and F the links connecting the balls, and together forming the check-rower wire.

Each ball A is perfectly smooth on its exterior surface, except at diametrically-opposite points, where it is perforated for the entrance of links F F, as shown at *a a*. These openings *a a* are widened outwardly, as shown, so as to permit a certain amount of play to links F F without the same being cut by the outer edges of the openings.

Each ball A consists of two opposite halves, B E. The lower one, B, (shown in detail, Fig. 3,) consists of a hollow hemispherical body having formed at diametrically-opposite points on its equator or edge the half-rounded recesses *a'*, which correspond with similar recesses on the upper half and form the openings *a* of the complete ball. The lower half, B, has rising from its interior a partition, C, as shown, which stands at right angles to a line drawn between recesses *a' a'* and centrally between said recesses. This partition C is preferably formed integral with the body of half B, or rigidly secured thereto, and its upper surface is rounded, as shown, to correspond to the concave interior of the upper half, E, when adjusted thereon, so that the interior of ball A will be centrally divided by the partition C and communication between the openings *a a* of the ball effectually prevented. From the center or top of partition C rises a stud or rivet, *c*, integral with the partition, which rivet is preferably angular or oval in cross-section, for the purpose of preventing any twisting or turning of the upper half, E, upon half B, when secured thereon, as hereinafter described. The halves B and E are preferably made of malleable metal, the rivet *c* being rendered malleable in all cases.

The half E of ball A is similar in size and shape to half B, but has no partition on its interior. This half is provided on its edge with recesses *a' a'*, similar to those on part B and registering therewith, as described, to form the openings *a* of the ball. At the apex of half E is made an opening, *e*, corresponding in size and form to the cross-section of rivet *c*.

The links F F are each made of a stout wire cut to proper length, and then headed by suitable means, forming on its ends the heads *d d*, as shown. These heads *d* are of proper size to fit easily within the compartments formed in ball A by partition C, and the diameter of the wire is slightly less than the diameter of the openings $a\ a$, so that the links F can have a degree of swivel-play on said balls A, when secured thereto, as shown, as is evident.

The manner of putting up the wire is as follows: One of the headed ends of each of two opposite links, F F, is placed in the corresponding recess $a$ of the lower half, B, of a ball, A. The upper half, E, is then adjusted on the lower half, B, by inserting rivet $c$ through opening $e$. The rivet is then headed in the usual manner, firmly securing half E on half B, and locking them together with the recesses $a'$ corresponding. The rivet $c$ and opening $e$, being angular or irregular in outline, as described, effectually prevent the halves turning on each other, and the completed ball A presents a regular unbroken surface, except for openings $a$, through which project the links F F. The half B may be thickened at the base of partition C, and the half E around opening $e$, as shown, to strengthen said parts.

It will be observed that the partitions in balls A effectually prevent the heads $d\ d$ of the wires passing each other therein, and thereby becoming liable to catch and "kink" the wire or its doubling or twisting at the joints; that the smooth balls A A will not jerk or catch on the forks of the check-rower mechanism, as do the button and twisted eye-wires commonly used, thereby producing a better and more regular action of said mechanism, and reducing the liability of breakage of the wire to a minimum, whereas with the twisted wires the catching is frequent, often causing annoying breakages of the wire or of the planting mechanism; and, finally, it is obvious that by dispensing with any twisted ends to my wire link I save a large amount of the same. The solid headed ends of my links F being entirely within the balls A, there are no projections or rough surfaces to catch in the mechanism where this wire is employed.

My improved wire can be wound upon a reel without injury thereto, as is obvious.

Having described my invention, what I claim is—

1. A check-rower wire composed of hollow sectional balls provided with a central partition and wire-link openings on opposite sides of said partition, and suitable connecting-links between the said balls, substantially as set forth.

2. A check-rower wire composed of hollow spherical balls A, provided with central partitions, and diametrical link-openings on opposite sides of said partitions, and wire links headed at their ends and engaged in opposite openings of adjoining balls A, all substantially as and for the purpose described.

3. The combination of the balls A, each composed of a lower half, B, provided with a central partition, C, and recesses $a'$, and an upper half, E, provided with corresponding recesses $a'$, and adapted to be fitted upon half B, with suitable connecting-links between and secured to said balls, all substantially as and for the purpose described.

4. The hollow balls A, for forming knots on check-rower wires, each composed of a lower half, B, provided centrally with an upstanding partition, C, having a rivet, $c$, on its upper portion, and having recesses $a'$ on diametrically-opposite sides of said partition, and an upper half, E, having a rivet-opening, $e$, corresponding to rivet $c$ of half B, and recesses $a'$, the recesses $a'$ of the two halves, when properly adjusted on each other, forming openings for the reception of the ends of suitable connecting-links, all substantially as and for the purpose set forth.

5. The herein-described check-rower wire for check-rower planters, consisting of the balls A A, each composed of a lower half, B, having a central partition, C, rivet $c$, and link-recesses $a'$, and an upper half, E, provided with a rivet-opening, $e$, and link-recesses, in combination with the link-wires F, having headed ends $d$, all constructed and arranged substantially as and in the manner and for the purpose specified.

In testimony that I claim the foregoing as my own I affix my signature in presence of two witnesses.

WM. W. DUNN.

Witnesses:
G. V. COGGESHALL,
SAMUEL SEABURY.